(12) United States Patent
Yajima

(10) Patent No.: US 7,973,851 B2
(45) Date of Patent: Jul. 5, 2011

(54) AUTO-FOCUS SYSTEM

(75) Inventor: Shinya Yajima, Saitama (JP)

(73) Assignee: Fujifilm Corporation, Tokyo (JP)

( * ) Notice: Subject to any disclaimer, the term of this patent is extended or adjusted under 35 U.S.C. 154(b) by 1027 days.

(21) Appl. No.: 11/139,613

(22) Filed: May 31, 2005

(65) Prior Publication Data

US 2005/0264680 A1 Dec. 1, 2005

(30) Foreign Application Priority Data

Jun. 1, 2004 (JP) ................................ 2004-163173

(51) Int. Cl.
*G03B 13/00* (2006.01)
*H04N 5/232* (2006.01)
*H04N 5/222* (2006.01)

(52) U.S. Cl. .................................. 348/346; 348/333.03
(58) Field of Classification Search ............. 348/333.03, 348/346
See application file for complete search history.

(56) References Cited

U.S. PATENT DOCUMENTS

| | | | | |
|---|---|---|---|---|
| 4,614,975 A | * | 9/1986 | Kaite | ............................. 348/354 |
| 5,001,507 A | * | 3/1991 | Iida et al. | ...................... 396/104 |
| 5,625,415 A | * | 4/1997 | Ueno et al. | ..................... 348/350 |
| 5,905,919 A | * | 5/1999 | Ide | ................................. 396/121 |
| 6,388,707 B1 | | 5/2002 | Suda | |
| 6,774,935 B1 | * | 8/2004 | Morimoto et al. | ......... 348/211.5 |
| 7,289,143 B2 | * | 10/2007 | Takagi et al. | .............. 348/222.1 |
| 2003/0117517 A1 | * | 6/2003 | Ogino | ........................... 348/356 |
| 2004/0036792 A1 | | 2/2004 | Moriya et al. | |
| 2004/0150724 A1 | * | 8/2004 | Nozaki et al. | .............. 348/211.4 |
| 2005/0007486 A1 | * | 1/2005 | Fujii et al. | ..................... 348/345 |

FOREIGN PATENT DOCUMENTS

| | | |
|---|---|---|
| JP | 7-283993 A | 10/1995 |
| JP | 10-173980 A | 6/1998 |
| JP | 2002-330333 A | 11/2002 |

\* cited by examiner

*Primary Examiner* — Sinh Tran
*Assistant Examiner* — Albert H Cutler
(74) *Attorney, Agent, or Firm* — Birch, Stewart, Kolasch & Birch, LLP

(57) ABSTRACT

An auto-focus system comprising an AF area indicating device for indicating a range of an AF area in the shooting screen, an AF area changing device for changing a range of an AF area to be set in the focus controlling device to a range of an AF area indicated by the AF area indicating device, and a switching device for switching a change of a range of an AF area by the AF area changing device between possible and impossible, wherein the change at least relates to the location of an AF area, and wherein the switching device switches a change of a range of an AF area to impossible when the view finder controlling device has no function of displaying the AF area information on the view finder.

13 Claims, 3 Drawing Sheets

AUTO-FOCUS SYSTEM

BACKGROUND OF THE INVENTION

1. Field of the Invention

The present invention relates to an auto-focus system, and more specifically, to an auto-focus system in which a range of an AF area to be set as auto-focus coverage can be changed within a shooting screen.

2. Related Art

As an auto-focus (AF) adopted for a video camera such as a broadcasting TV camera, Contrast type AF is known. The Contrast type AF obtains an image of an object imaged through a picture-taking lens by an image pickup device and controls a focus of the picture-taking lens to maximize a contrast of the image of the object.

The Contrast type AF does not make the entire shooting screen (a shot area) AF coverage. The Contrast type AF usually makes a part, for example a rectangle area, of shooting screen (an AF area) AF coverage. The Contrast type AF in which a range of an AF area within a shooting screen (e.g., the location) can be changed and a desired object in the shot area can be focused by AF has also been known (for example, see Japanese Patent Application Laid Open No. 10-173980).

A video camera has a display (monitor) generally called "view finder", which displays, for example, an image currently taken by the camera in real time so that an operator such as a cameraperson can check a composition of the image. The view finder is also used as a monitor for displaying various types of information such as information of camera setting or lens setting in addition to the currently taken picture. A view finder in which an AF frame indicating a range of the abovementioned AF area is superimposed on the taken picture is also known.

A video camera whose view finder displays an AF area and a video camera which adopts a line of vision AF mode in which the location of an AF area is changed by the cameraperson's line of vision are disclosed in Japanese Patent Application Laid Open No. 7-283993. With this technique, an indication of the location of the AF area is changed on the view finder in response to a change of the location of the AF area. In Japanese Patent Application Laid Open No. 7-283993, a mode in which the location of the AF area is not changed (central emphasis AF mode) can also be selected as well as the line of vision mode. In such a central emphasis mode, an AF area is not indicated so as to avoid complicating a screen of the view finder.

SUMMARY OF THE INVENTION

In a shooting system in which a lens device with a picture-taking lens is detachable to a camera (camera head) like a TV camera, the camera usually collects information required for displaying various types of information on a view finder, generates picture signals with various types of information superimposed on the taken picture in a circuit in the camera and outputs them to the view finder. When an auto-focus system in which a range of an AF area can be changed as mentioned above is incorporated in such a shooting system, the system may be build as below, for example. A main circuit for performing AF processing is mounted on a lens device and signals of an image of an object required for the Contrast type AF (picture signals for AF) is provided from a camera to the lens device. An operating device on which an operator indicates a range of an AF area is connected to the lens device. The operator's manipulation is received via the operating device and information indicating the range of the AF area based on the received manipulation is sent from the operating device to the lens device.

In order to display AF area information relating to a range of an AF area, such as an AF frame, on a view finder in such a shooting system incorporating an auto-focus system, a camera needs to obtain a range of an AF area designated through the abovementioned operating device from a lens device or an operating device, superimpose AF area information corresponding to the range of the AF area on the taken picture and displays it on the view finder.

However, some conventional cameras have a function of displaying AF area information on a view finder but the other conventional cameras do not. Although a camera without a function of displaying AF area information may display a fixed rectangle frame similar to an AF frame at a center of the view finder screen, the fixed rectangle frame does not match the actual AF area.

Thus, a camera forming a shooting system may not have a function of displaying AF area information. In such a case, when an operator changes a range of an AF area by manipulating an operating device, the operator cannot check the range of the AF area on the view finder and hard to designate a desired range as an AF area. Once an AF area is changed from a preset range, it is also difficult to infer the range the AF area is set on the shooting screen.

The present invention is adapted in view of the abovementioned circumstance, and intends to provide an auto-focus system in which a problem due to a change of a range of an AF area can be avoided where a range of an AF area can be changed and the system has no function of displaying AF area information on a view finder.

In order to achieve the abovementioned object, an auto-focus system according to the first aspect of the present invention is an auto-focus system including a focus controlling device for setting an AF area in a shooting screen of a camera and controlling a focus of a picture-taking lens to focus on an object in the AF area, and an AF area display information outputting device for outputting AF area display information for displaying AF area information relating to a range of the AF area on a view finder displaying an image taken by the camera to a view finder controlling device for controlling a display of the view finder, further including an AF area indicating device for indicating a range of an AF area in the shooting screen, an AF area changing device for changing a range of an AF area to be set in the focus controlling device to a range of an AF area indicated by the AF area indicating device, and a switching device for switching a change of a range of an AF area by the AF area changing device between possible and impossible, wherein the change at least relates to the location of an AF area, and wherein the switching device switches a change of a range of an AF area to impossible when the view finder controlling device has no function of displaying the AF area information on the view finder.

According to the first aspect, a change of a range of an AF area can be switched to possible or impossible according to whether or not AF area information such as an AF frame is displayed on a view finder. For example, if a range (particularly the location) of an AF area is changed when AF area information is not displayed on a view finder, the AF area cannot be set in a desired range, and if a range of an AF area is changed, where the range is set cannot be inferred. In such a case, a change of a range of an AF area is preferably made impossible. As a change of an AF area automatically becomes impossible when AF area information is not displayed on the view finder, operator's tasks to determine and select whether to make a change of an AF area impossible can be saved.

An auto-focus system according to the second aspect of the present invention is the first aspect wherein when the view finder controlling device does not receive AF area display information from the AF area display information outputting device, the switching device determines that the view finder controlling device has no function of displaying the AF area information on the view finder. For example, if the view finder controlling device has no function of displaying AF area information on the view finder, the view finder controlling device does not require AF area display information nor receive AF area information, which can be a base of determination whether or not the view finder controlling device has the function.

An auto-focus system according to the third aspect of the present invention is that when the switching device makes a change of a range of an AF area impossible, at least the location of an AF area set by the focus controlling device is fixed to a predetermined location. When a change of a range of an AF area is made impossible, the range of the AF area can be easily inferred even if AF area information is not displayed on a view finder by previously fixing at least the location of an AF area on the fixed location.

According to the auto-focus system of the present invention, a problem due to a change of a range (mainly the location) of an AF area can be avoided when the system has no function of displaying AF area information on a view finder.

DETAILED DESCRIPTION OF THE PREFERRED EMBODIMENTS

A preferred embodiment of an auto-focus system according to the present invention will be described in detail with reference to the attached drawings.

Figure 1:
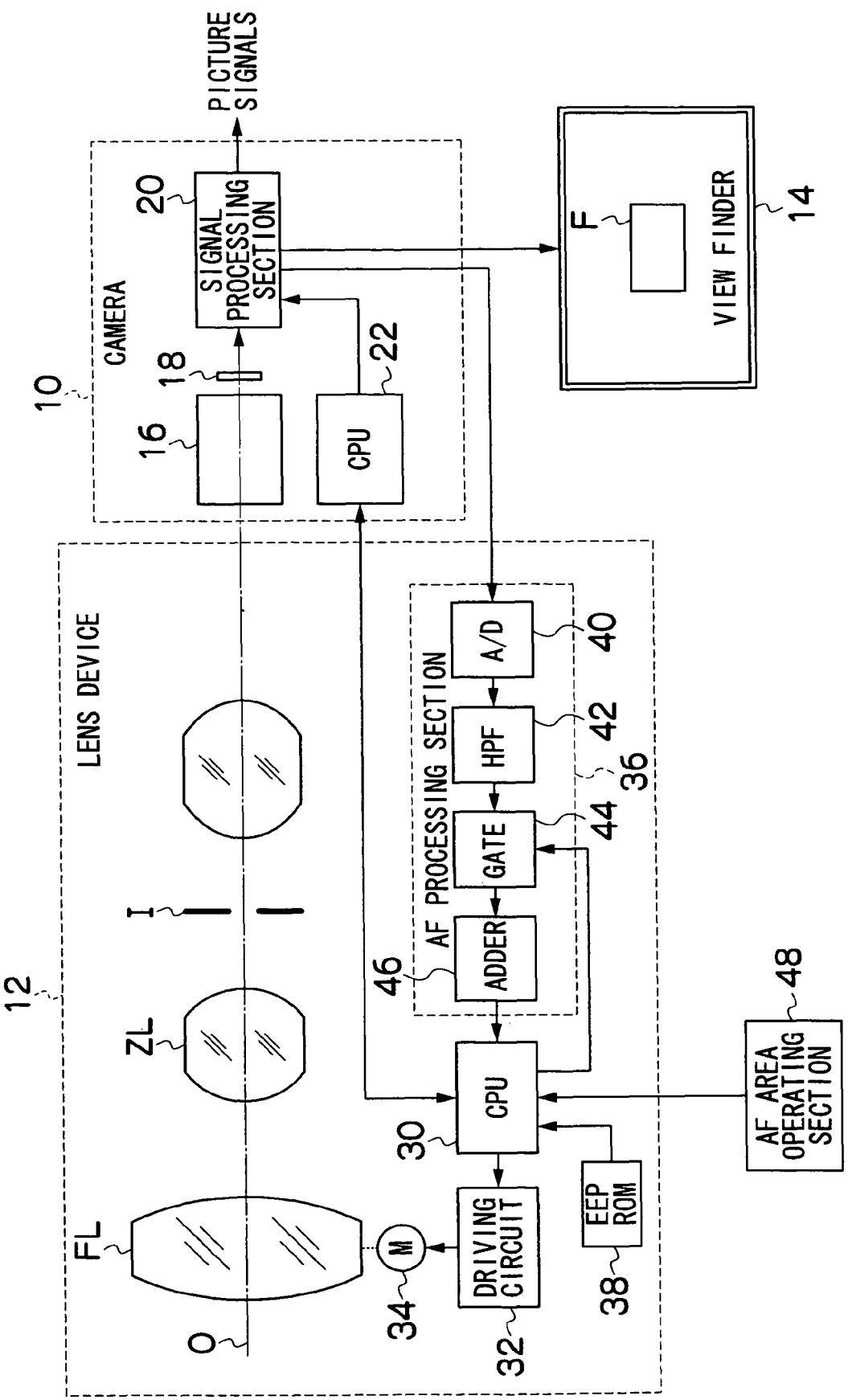
FIG. 1 is a block diagram showing a configuration of a shooting system applying an auto-focus system according to the present invention.

FIG. 1 is a block diagram showing a configuration of a shooting system applying an auto-focus system according to the present invention. The shooting system in the figure is a system used for, for example, a broadcasting TV camera, including a camera 10 (camera head), a lens device 12 having picture-taking lenses (optical system) attached to the camera 10 via a mount and a controlling system for controlling the picture-taking lenses, and a view finder 14. The picture-taking lenses and the controlling system of the lens device 12 can form a single device or a part or an entire of the controlling system can form a device independent from the picture-taking lenses.

As the picture-taking lenses of the lens device 12, focus lens(es) FL, zoom lens(es) ZL, iris (I), relay lens(es) RL and the like are placed along an optical axis O. The focus lens FL and zoom lens ZL are movable along the optical axis. A focus location (distance to the object) changes according to movement of the focus lens FL. Image magnification (binocular vision) changes according to movement of the zoom lens ZL. The iris I opens and closes and brightness of the image changes according to how much the iris I opens or closes.

On the camera 10, a color separation optical system 16 for separating an object light incoming through the picture-taking lens into waves of three colors of red (R), green (G) and blue (B), and an image pickup device for each of R, G and B for taking a picture of the object light of each color after color separation (e.g., CCD) are placed. The picture-taking devices for R, G and B placed on the location on the light path at the optically equal distances are represented as a single picture-taking device 18 as shown in the figure. The light of an object incoming on the imaging surface of the picture-taking device 18 is subject to photoelectric conversion by the picture-taking device 18 and signal processing by a predetermined signal processing section 20 in the camera 10. Picture signals in a predetermined form are generated by the signal processing at the signal processing section 20 and outputted to an outside appliance such as a recorder. Picture signals in which later described information on an AF area (AF area information) is superimposed on a taken picture are generated by the signal processing at the signal processing section 20 and outputted to a view finder 14 set on the camera 10. As AF area information, an AF frame F indicating a range (outline) of an AF area, for example, is displayed on a screen of the view finder 14.

The focus lens FL, the zoom lens ZL and the iris I for imaging lenses are electrically controlled by a controlling system of the lens device 12. In the embodiment of the present invention, only a control relating to an auto-focus (AF) is described and only a controlling system for controlling a focus lens FL by AF is shown in the figure.

On the controlling system of the lens device 12, a CPU 30, a driving circuit 32, a motor 34, an AF processing section 36 and the like are loaded. The focus lens FL of the picture-taking lenses is connected with the motor 34, which is driven by control signals outputted from the CPU 30 to the driving circuit 32 and moves the focus lens FL so that the CPU 30 can control the location and moving speed of the focus lens FL.

On the other hand, picture signals (luminance signals) generated in the abovementioned manner are sent from the signal processing section 20 of the camera 10 to the lens device 12 and input into the AF processing section 36. The AF processing section 36 includes an A/D converter 40, a high path filter (HPF) 42, a gate circuit 44 and an addition circuit 46. First, the picture signals input from the camera 10 to the AF processing section 36 are converted into digital signals by the A/D converter 40. Next, only signals of high frequency component are extracted from the picture signals by HPF 42. Then, the picture signals of high frequency component are input into a gate circuit 44 and only picture signals within a range corresponding to a predetermined AF area set in the shooting screen are extracted. The range of the AF area for extracting picture signals at the gate circuit 44 is set by AF area signals provided from the CPU 30. The picture signals in the AF area extracted by the gate circuit 44 is input into the addition circuit 46 and integrated for each field (for each screen). An integrated value obtained at the addition circuit 46 in this manner is a focus evaluation value indicating the degree of the contrast of an object image in an AF area.

The CPU 30 controls the focus lens FL, while obtaining the focus evaluation value from the AF processing section 36 and moves the focus lens FL to the location (focus point) where the focus evaluation value become the highest (the maximum). In this manner, a focus of the picture-taking lens is controlled so that an object in the AF area is focused. So called hill-climbing method is used as a method for moving the focus lens FL to a focus point where the focus evaluation value is the highest and the processes below are performed for example. When the CPU 30 starts AF processing, it displaces the focus lens FL by minimum distance to the hyperfocal point and to the infinity (so called wobbling), obtains a focus evaluation value at each displaced point from the AF processing section 36 and compares the values. Based on the result, the CPU 30 detects the direction in which the focus lens FL moves to increase the focus evaluation value. When no direction in which the focus evaluation value increases is detected, the CPU 30 determines that the focus lens FL focuses on the object and sets the focus lens FL to the location before the wobbling. On the other hand, when a direction in which the focus evaluation value increases is detected, the CPU 30 moves the focus lens FL in the direction, sequentially obtaining the focus evaluation values from the AF processing section 36. When the focus lens FL passes the location where the focus evaluation value is the maximum, the CPU 30 detects the maximum value of the focus evaluation value. When the CPU 30 detects the maximum value of the focus evaluation value, it moves the focus lens FL to the location where the maximum value is detected and stops the lens there. In this manner, the picture-taking lens is set as focusing on the object. The CPU 30 repeats the AF processing to sequentially focus each lens by AF.

Figure 2:
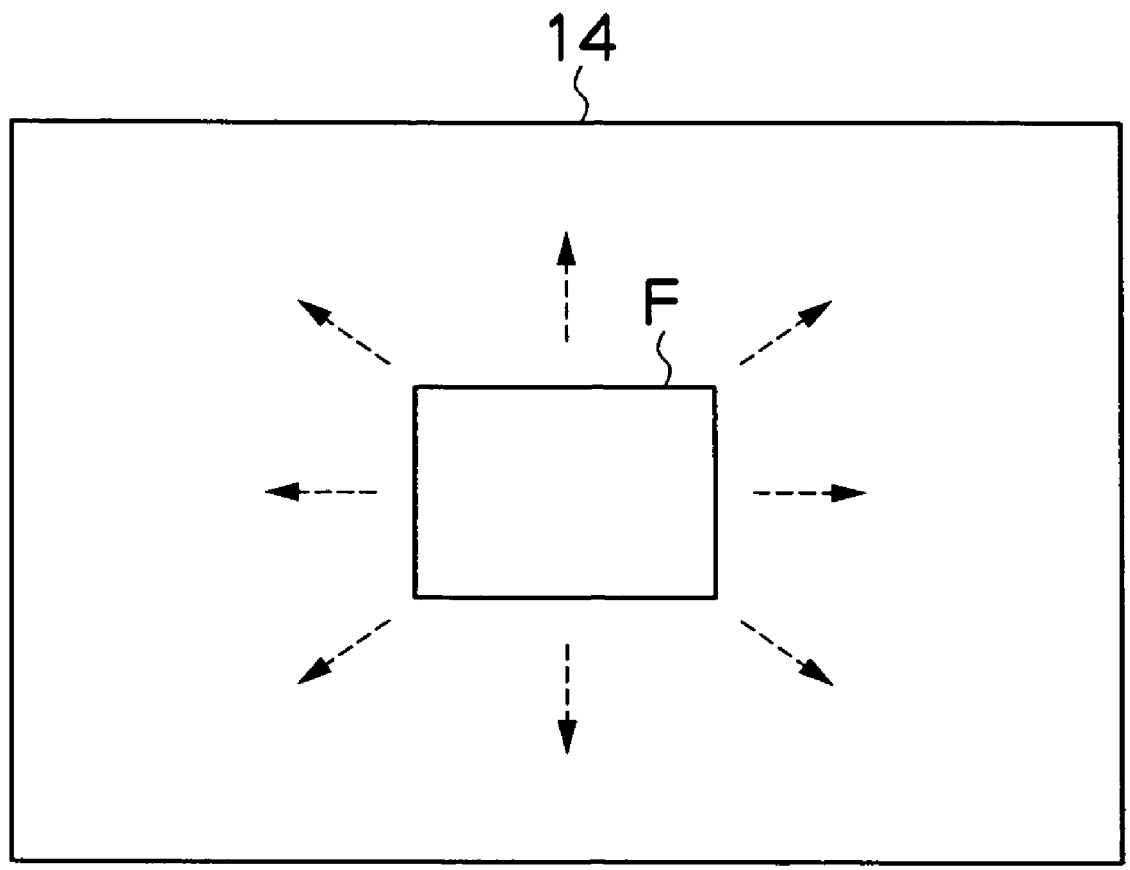
FIG. 2 is a diagram showing an AF frame on a screen of a view finder.

Now, processing by the CPU 30 relating to the AF area will be described. As shown in FIG. 2, an AF area F, which is AF coverage, is set on a shooting screen (or a screen of view finder 14) P.

To lens device 12, an AF area operating section 48 (AF area operating device) is connected so that an operator can change a range of the AF area F by manipulating the AF area operating section 48 when the camera 10 has a function of displaying AF area information relating to the range of the AF area F, such as an AF frame indicating the range (outline) of the AF area F on the view finder 14 as shown in FIG. 2.

On the AF area operating section 48, operating parts for an operator to designate (change) a range of an AF area including the location, size and shape of the AF area to a desired range on the shooting screen is placed. For example, as operating parts for designating the location of the AF area, a track ball and a joy stick is placed. With the parts, the location of the AF area F can be changed vertically and horizontally (or diagonally) as shown in FIG. 2. The initial range of the AF area, for example at turn-on, is predetermined to a standard range, for example.

The AF area operating section 48 outputs AF area indicating information indicating a range of an AF area according to manipulation of an operator and provides the AF indicating information to the CPU 30 of the lens device 12. When the camera 10 has a function of displaying AF area information on the view finder 14, the CPU 30 sets the range of the AF area according to the AF area indicating information provided from the AF area operating section 48 and provides AF area signals corresponding to the range of the AF area to the gate circuit 44 of the AF processing section 36. Accordingly, picture signals of the range of the AF area are extracted by the gate circuit 44 and the focus evaluation value is obtained based on the picture signals in the AF area. By performing AF processing on the basis of the focus evaluation value, the CPU 30 performs a focus control so that the object in the AF area is focused.

The CPU 30 and a CPU 22 in the camera 10 exchange various signals by communication (e.g., serial communication). When the camera 10 has a function of displaying AF area information on the view finder 14, the CPU 22 in the camera 10 requires the CPU 30 on the lens device 12 to send the AF area display information for displaying the AF area information on the view finder 14 via the communication. In response to the request of the AF area display information from the CPU 22 in the camera 10, the CPU 30 sends AF area display information corresponding to a range of a currently set AF area to the CPU 22 in the camera 10. When the CPU 22 in the camera 10 obtains the AF area display information, the AF area display information is provided to the signal processing section 20.

The signal processing section 20 merges picture signals of a taken picture to be output to the view finder 14 with picture signals of the AF frame indicating a range (outline) of an AF area. Thus, the AF frame is displayed as the AF area information with the taken picture on the view finder 14. The operator can set a desired range on the shooting screen to an AF area by manipulating the AF area operating section 48 as checking the AF frame on the view finder 14.

In contrast, there is a case that the camera 10 has no function of displaying the AF area information on the view finder as mentioned above. In such a case, as the camera 10 does not request from the CPU 30 in the lens device 12 to send the AF area display information, the CPU 30 in the lens device 12 can determine whether or not the camera 10 has such a function based on whether or not the AF area display information is requested. When the camera 10 does not request AF area information, the CPU 30 makes a change of an AF area impossible. In other words, the CPU 30 does not change a range of an AF area according to the AF area indicating information from the AF area operating section 48. Then, the CPU 30 reads a predetermined range of an AF area from EEPROM 48 and sets the range as the AF area. This avoids a problem due to a change of an AF area when a camera without a function of displaying AF area information on the view finder 14 is used. The range of an AF area stored on EEPROM 48 can be changed by a user to a desired range. Determination whether the camera 10 has a function of displaying AF area information on the view finder 14 can be performed in a way other than the determination whether the camera 10 requests the AF area displaying information.

Figure 3:
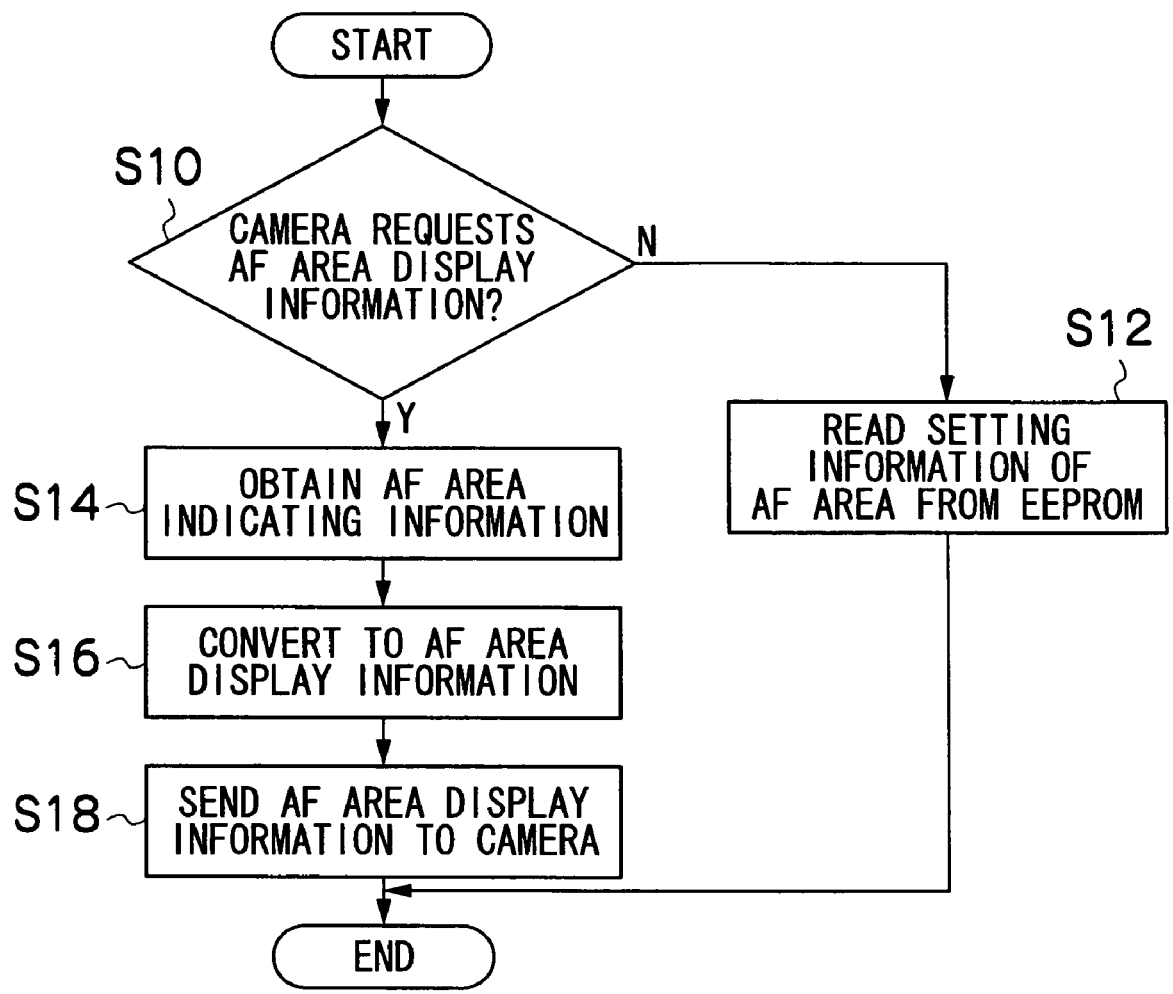
FIG. 3 is a flowchart showing a procedure in a CPU of a lens device.

A series of processes of the abovementioned CPU 30 will be described by flowchart in FIG. 3. When the CPU 30 starts communication with the camera 10 (CPU 22), it determines whether the camera 10 requests AF area display information (step S11). When it is determined NO, the CPU 30 reads setting information indicating the predetermined range of the AF area from the EEPROM 38 and sets an AF area to a range indicated by the setting information (step S12).

On the other hand, when it is determined YES at step S10, the CPU 30 obtains the AF area indicating information from the AF area operating section 48 (step S14). Then the CPU 30 sets an AF area to a range indicated by the AF area indicating information and converts the range of the set AF area to the AF area display information for displaying as the AF area information on the view finder 14 (in the form for sending information on the range of the AF area to the camera 10) (step S16) and sends the AF area display information to the camera 10 (step S18). The processes of the above steps S10-S18 are repeated with other processes.

Although a range of an AF area that can be changed by the AF area operating section 48 has been described as the location, size and shape of the AF area in the abovementioned embodiments, it is not limited that all the elements to determine a range of an AF area is changeable, and any one element or any elements may be changed and the other elements may remain unchanged. For example, only the location of the AF area can be changed and the shape can be fixed to a rectangle and the size can also be fixed. Or, the location and size of the AF area can be changed and the shape can be fixed to a rectangle.

When elements including the location among the elements determining a range of an AF area can be changed and the camera 10 has no function of displaying AF area information on the view finder 14, only the location of the AF area is fixed unchangeable to the predetermined location (e.g., at a center of the screen) and the other elements remain changeable. If the location of an AF area is fixed, no big problem can occur even when AF area information such as an AF frame is not displayed on the view finder 14 and elements other than the location (e.g., size) is changed.

Although whether a change of a range of an AF area is made possible or impossible (made invalid) is automatically switched based on whether the camera 10 has a function of displaying the AF area information on the view finder 14 in the abovementioned embodiment, the present invention is not limited to this embodiment and adapted so that an operator selects either of them via a predetermined selecting device (switch).

Although the abovementioned embodiment is described by the case that the present invention is applied in Contrast type AF, the present invention can be applied to the cases other than Contrast type AF shown in the abovementioned embodiment.

What is claimed is:

1. An auto-focus system comprising:
   a picture-taking lens device detachably attached to a camera via a mount;
   a focus controlling device on the picture-taking lens device for setting an AF area in a display of a view finder of the camera and controlling a focus of a picture-taking lens to focus on an object in the AF area;
   a view finder controlling device for controlling the display of the view finder displaying an image taken by the camera;
   an AF area display information outputting device on the camera for outputting AF area display information for displaying AF area information relating to a range of the AF area;
   an AF area indicating device for indicating a range of an AF area in the display of the view finder;
   an AF area changing device for changing a range of an AF area to be set in the focus controlling device to a range of an AF area indicated by the AF area indicating device; and
   a switching device for switching a change of a range of an AF area by the AF area changing device between possible and impossible, wherein the change at least relates to the location of an AF area, and wherein the switching device switches a change of a range of an AF area to impossible when the view finder controlling device has no function of displaying the AF area information on the view finder,
   wherein said focus controlling device on the picture-taking lens device performs a test to determine if the AF area display information outputting device has requested AF area display information from the focus controlling device, and
      if the AF area display information outputting device on the camera has requested that the focus controlling device send AF area display information to the AF area display information outputting device, then the focus controlling device determines whether or not that said camera has a function of displaying the AF area information on the view finder, and
      if the AF area display information outputting device has not requested that the focus controlling device send AF area display information to the AF area display information outputting device, then the focus controlling device determines that said camera has no function for displaying the AF area information on the view finder.

2. The auto-focus system according to claim 1, wherein when the view finder controlling device does not receive AF area display information from the AF area display information outputting device, the switching device determines that the view finder controlling device has no function of displaying the AF area information on the view finder.

3. The auto-focus system according to claim 2, wherein when the switching device makes a change of a range of an AF area impossible, at least the location of an AF area set by the focus controlling device is fixed to a predetermined location.

4. The auto-focus system according to claim 1, wherein when the switching device makes a change of a range of an AF area impossible, at least the location of an AF area set by the focus controlling device is fixed to a predetermined location.

5. The auto-focus system according to claim 1, wherein a range of an AF area is an outline of the AF area.

6. An auto-focus system comprising:
   a picture-taking lens device detachably attached to a camera via a mount;
   a first processing unit on the picture-taking lens device for controlling a focus lens and obtaining a focus evaluation value;
   an AF processing section for obtaining, said focus evaluation value;
   an AF area operating section for changing a range of an AF area; and
   a second processing unit on the camera for sending a request to said first processing unit to send AF area display information, for displaying said AF area information on a view finder, wherein said view finder superimposes picture signals and said AF area information,
   wherein said first processing unit on the picture-taking lens device performs a test to determine if said second processing unit has requested AF area display information from said first processing unit, and
      if said second processing unit on the camera has requested that said first processing unit send AF area display information to said second processing unit, then said first processing unit determines that a camera associated with said second processing unit has a function of displaying said AF area information on said view finder, and
      if said second processing unit has not requested that said first processing unit send said AF area display information to said second processing unit, then said first processing unit determines that said camera has no function for displaying said AF area information on said view finder.

7. The auto-focus system according to claim 6, wherein said AF processing section comprises:
   a high path filter for extracting signals of high frequency component from picture signals input from said camera, and
   a gate for extracting, from said signals of high frequency component, picture signals within a range corresponding to a predetermined AF area.

8. The auto-focus system according to claim 7, wherein a range of said AF area for extracting picture signals at said gate circuit is set by AF area signals provided from said first processing unit.

9. The auto-focus system according to claim 6, wherein an operator can change a range of an AF area by manipulating said AF area operating section when said camera has a function of displaying AF area information relating to a range of said AF area.

10. The auto-focus system according to claim 6, wherein said AF area operating section outputs AF area indicating information indicating a range of an AF area and provides said AF indicating information to said first processing unit.

11. The auto-focus system according to claim 6, wherein, if said camera does not request an AF area display information, setting information of an AF area is read from a memory.

12. The auto-focus system according to claim 6, wherein a range of an AF area that can be changed by said AF area operating section is a location, size or shape of said AF area.

13. The auto-focus system according to claim 6, wherein, when said camera has no function of displaying AF area information on said view finder, a location of said AF area is fixed to a predetermined location.

* * * * *